(12) United States Patent
Jin et al.

(10) Patent No.: US 8,411,826 B2
(45) Date of Patent: Apr. 2, 2013

(54) VOICEMAIL NOTIFICATION SERVER LOAD BALANCING

(75) Inventors: Zhiying Jin, Lexington, MA (US); Wei Xia, Sudbury, MA (US); Gerald Honma, Aiea, HI (US); Jo Ann Kagawa, Honolulu, HI (US); Jianxiu Hao, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 958 days.

(21) Appl. No.: 12/487,472

(22) Filed: Jun. 18, 2009

(65) Prior Publication Data

US 2010/0322393 A1 Dec. 23, 2010

(51) Int. Cl.
*H04M 1/64* (2006.01)
*H04L 12/66* (2006.01)
*H04W 4/12* (2009.01)
*G06F 17/30* (2006.01)

(52) U.S. Cl. .............. 379/88.12; 379/88.03; 379/88.13; 379/88.14; 379/88.18; 379/88.23; 455/404.2; 455/412.1; 455/412.2; 455/414.1; 455/466; 707/731; 709/205; 709/218; 709/219; 709/236; 709/245; 715/752; 726/5

(58) Field of Classification Search .............. 379/88.03, 379/88.12, 88.13, 88.14, 88.18, 88.23; 455/412.1, 455/412.2, 414.1, 466, 404.2; 707/731; 709/205, 709/206, 218, 219, 236, 245; 715/752; 726/5
See application file for complete search history.

(56) References Cited

U.S. PATENT DOCUMENTS

| | | | | | |
|---|---|---|---|---|---|
| 6,049,831 | A | * | 4/2000 | Gardell et al. | 709/236 |
| 6,112,074 | A | * | 8/2000 | Pinder | 455/404.2 |
| 6,591,305 | B2 | * | 7/2003 | Densmore | 709/245 |
| 6,778,644 | B1 | * | 8/2004 | Jenkins et al. | 379/88.18 |
| 6,883,019 | B1 | * | 4/2005 | Sengupta et al. | 709/206 |
| 6,892,226 | B1 | * | 5/2005 | Tso et al. | 709/218 |
| 7,177,402 | B2 | * | 2/2007 | Metcalf | 379/88.03 |
| 7,305,438 | B2 | * | 12/2007 | Christensen et al. | 709/205 |
| 7,551,727 | B2 | * | 6/2009 | Howell et al. | 379/88.14 |
| 7,620,407 | B1 | * | 11/2009 | Donald et al. | 455/466 |
| 7,817,786 | B2 | * | 10/2010 | Lee et al. | 379/88.23 |
| 7,908,647 | B1 | * | 3/2011 | Polis et al. | 726/5 |
| 7,953,825 | B2 | * | 5/2011 | Marshall et al. | 709/219 |
| 8,023,975 | B2 | * | 9/2011 | Wickman et al. | 455/466 |
| 8,046,014 | B2 | * | 10/2011 | Donald et al. | 455/466 |
| 8,064,576 | B2 | * | 11/2011 | Skakkebaek et al. | 379/88.13 |
| 8,090,083 | B2 | * | 1/2012 | Fong et al. | 379/88.14 |
| 8,155,627 | B2 | * | 4/2012 | Hao et al. | 455/412.2 |
| 8,195,130 | B2 | * | 6/2012 | Hao et al. | 455/412.1 |
| 2007/0207785 | A1 | * | 9/2007 | Chatterjee et al. | 455/414.1 |
| 2009/0191848 | A1 | * | 7/2009 | Helferich | 455/412.1 |
| 2010/0150322 | A1 | * | 6/2010 | Yin et al. | 379/88.14 |
| 2010/0153855 | A1 | * | 6/2010 | Roberts et al. | 715/752 |
| 2010/0322393 | A1 | * | 12/2010 | Jin et al. | 379/88.12 |
| 2011/0126126 | A1 | * | 5/2011 | Blair | 715/752 |
| 2012/0179673 | A1 | * | 7/2012 | Kelly et al. | 707/731 |

* cited by examiner

*Primary Examiner* — Gerald Gauthier

(57) ABSTRACT

A device receives, from a management server, an optimal number of threads, generates a dynamic thread based on the optimal number of threads, and retrieves, from a message store, a message based on the dynamic thread and when the message store is not empty. The device receives a binding from a voicemail server associated with a voicemail user, generates a notification based on the retrieved message and based on the binding, and provides the notification to a user device associated with the voicemail user.

25 Claims, 9 Drawing Sheets

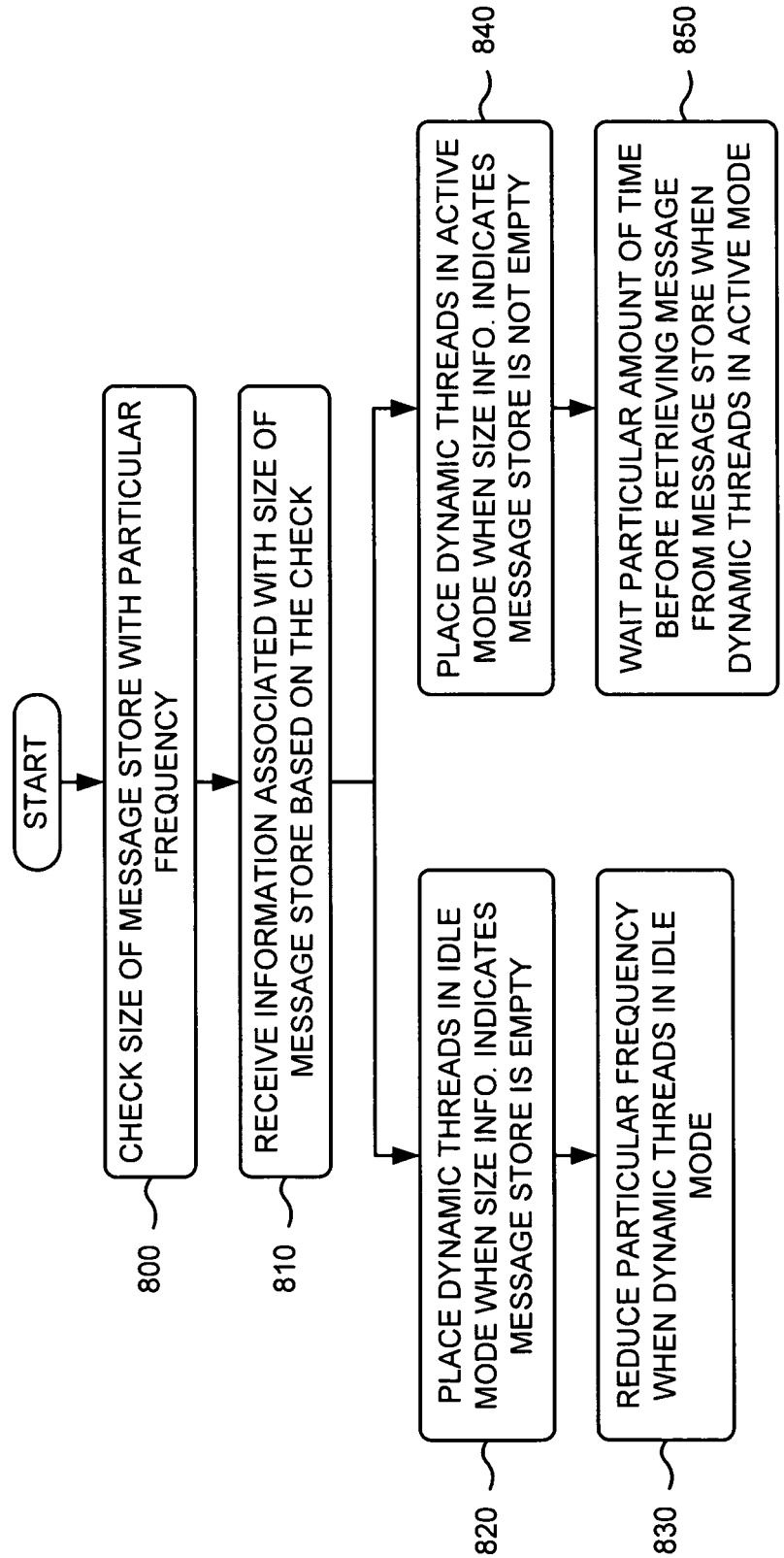

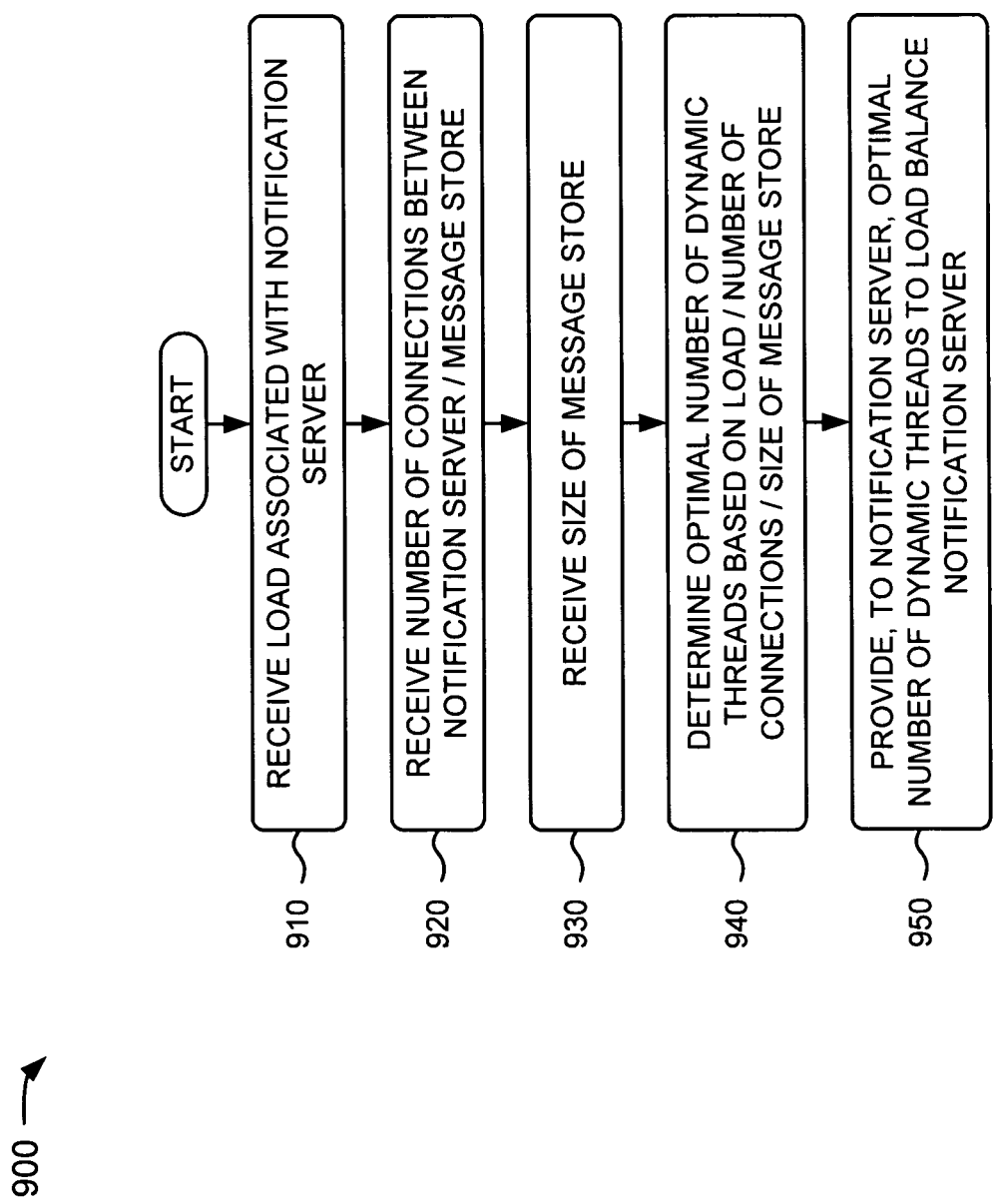

VOICEMAIL NOTIFICATION SERVER LOAD BALANCING

BACKGROUND

Visual voicemail (VVM) is a user friendly application that adds a visual aspect to managing voicemail messages. Traditional telephone user interface (TUI) voicemail requires users to dial into a system to listen to voicemails in a sequential order. VVM may enable mobile phone users to manage voicemail message in an order of their choice, e.g., in a random order rather than a sequential order.

VVM and some voicemail systems may be associated with one or more notification servers that notify mobile phone users about new (or not retrieved) voicemail messages. The notification servers serve as a gateway between the VVM/voicemail systems and mobile phones. The notification servers receive messages from the VVM/voicemail systems through bindings created by the VVM/voicemail systems, and the notification servers create notifications based on the messages and/or bindings. A binding may include a reference (e.g., an identifier) to something (e.g., a value, a machine address, etc.) that is larger or more complicated than the reference. For example, a binding may use a simple identifier (e.g., "AA") to designate a more complicated machine address (e.g., "00010000111100001"). A binding may also provide information that instructs a notification server to create notifications and to send the notifications to particular user devices at particular times.

The bindings created by the VVM/voicemail systems are not load balanced. For example, some notification servers may receive a large number of bindings, while other notification servers may receive a smaller number of bindings. Due to unbalanced bindings among the notification servers, messages and/or notifications may be queued on some of the notification servers, which may cause significant delays. Furthermore, if a notification server is not operational, it will not receive messages when it becomes operational until the bindings are reset. Additionally, when a new notification server is added, the new notification server will not receive messages until a binding is created, which may take a considerable period of time (e.g., especially for third party voicemail systems).

BRIEF DESCRIPTION OF THE DRAWINGS

FIGS. 6-8 illustrate flow charts of an exemplary process for load balancing a notification server with a message store according to implementations described herein; and FIG. 9 depicts a flow chart of an exemplary process for load balancing a notification server with dynamically adjusted threads according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and/or methods that load balance one or more notification servers associated with a voicemail system and/or a VVM system. In one implementation, for example, the systems and/or methods may receive, from one or more voicemail servers, one or more messages associated with a voicemail user, and may store the one or more message in a message store. The systems and/or methods may generate one or more dynamic threads, based on an optimal number of threads received from a management server, and may retrieve, from the message store, a message when the message store is not empty and based on the one or more dynamic threads. The systems and/or methods may receive a binding from the one or more voicemail servers, may generate a notification based on the retrieved message and the binding, and may provide the notification to a user device associated with the voicemail user.

As used herein, the terms "user" or "voicemail user" are intended to be broadly interpreted to include a user device or a user of a user device.

Figure 1:
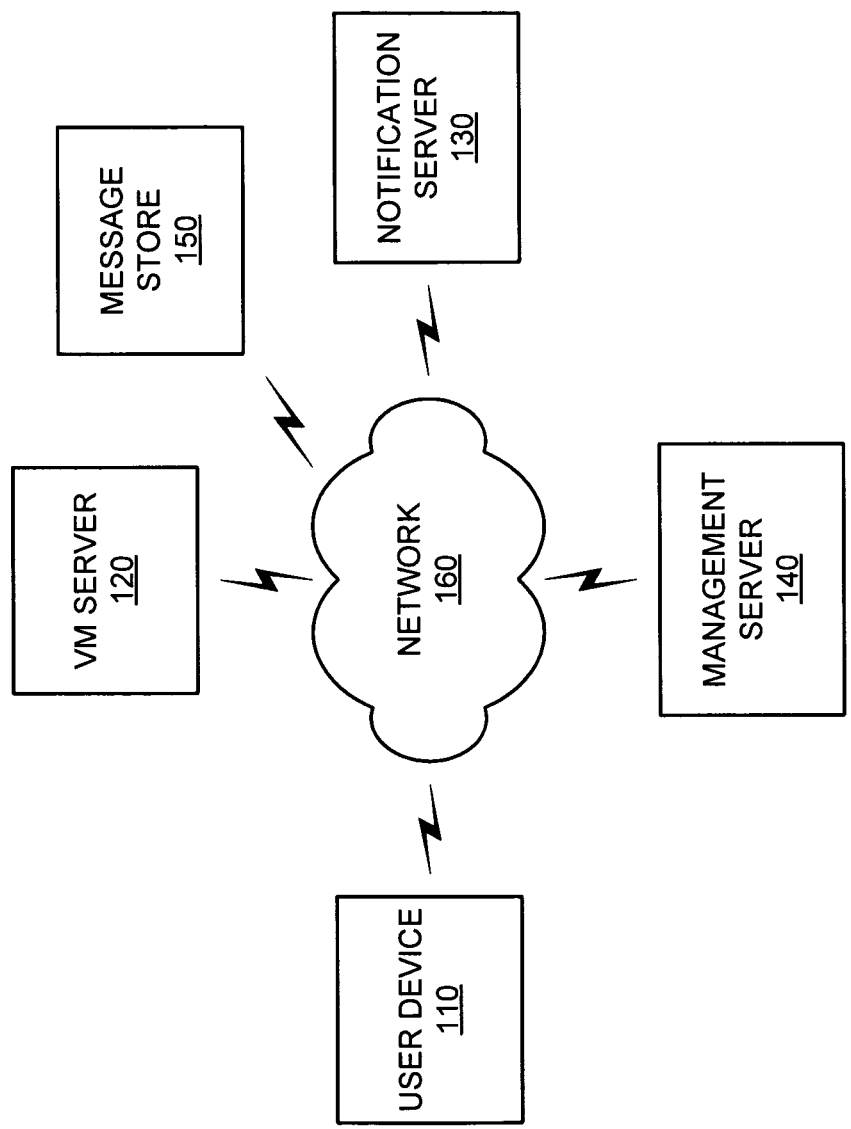
FIG. 1 depicts a diagram of an exemplary network in which systems and/or methods described herein may be implemented.

FIG. 1 is a diagram of an exemplary network 100 in which systems and/or methods described herein may be implemented. As illustrated, network 100 may include a user device 110, a voicemail (VM) server 120, a notification server 130, a management server 140, and a message store 150 interconnected by a network 160. Components of network 100 may interconnect via wired and/or wireless connections. A single user device 110, VM server 120, notification server 130, management server 140, message store 150, and network 160 have been illustrated in FIG. 1 for simplicity. In practice, there may be more user devices 110, VM servers 120, notification servers 130, management servers 140, message stores 150, and/or networks 160. Also, in some instances, one or more of the components of network 100 may perform one or more functions described as being performed by another one or more of the components of network 100.

User device 110 may include any device that is capable of accessing servers 120-150 via network 160. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a set-top box (STB), a television, a personal gaming system, or other types of computation or communication devices, threads or processes running on these devices, and/or objects executable by these devices. User device 110 may enable a user to provision and utilize a voicemail application or a VVM application (e.g., provided by VM server 120), and may receive notifications when a new voicemail arrives. For example, if user device 110 is web-based device, user device 110 (e.g., via a web browser) may permit a user to view, listen to, and/or manage voicemails through a hypertext transfer protocol over secure socket layer (HTTPS) on the Internet. If user device 110 is a cell phone, user device 110 may implement a Java-based VVM application that may permit a user to view, listen to, and/or manage voicemails.

VM server 120 may include one or more server entities, or other types of computation or communication devices, that gather, process, search, and/or provide information in a manner described herein. VM server 120 may provide a voicemail application or a VVM application to user device 110, may interface with, either directly or via a device proxy server (not shown), user device 110, and may interface with other backend servers (e.g., notification server 130, management server 140, and message store 150). VM server 120 may convert requests from user device 110 into a format that the backend servers may understand, and may aggregate different voicemail systems, such as home, office, and wireless voicemail systems, associated with a user of user device 110.

In one example, VM server 120 may provide, to notification server 130, bindings that enable notification server 130 to generate notifications. When new voicemails are received, VM server 120 may provide messages (e.g., that include a number of voicemails, a number of unheard voicemails, a list of voicemail identifiers (IDs), etc.) to notification server 130. Notification server 130 may generate notifications based on the messages and/or bindings received from VM server 120, and may provide the notifications to user device 110.

In another example, VM server 120 may provide voice mailboxes for home, office, or wireless devices (e.g., user device 110), and may provide a service wide directory for voice mailbox location lookup. The service wide directory may provide telephone numbers, locations of voice mailboxes, and/or other information associated with home, office, or wireless devices. VM server 120 may provide voicemail messages, from one or more voice mailboxes, for display to user device 110 via the voicemail application or the VVM application.

Notification server 130 may include one or more server entities, or other types of computation or communication devices, that gather, process, search, and/or provide information in a manner described herein. In one example, notification server 130 may receive, from VM server 120, a binding and a message, and may generate a notification (e.g., a voicemail notification message) that includes status information (e.g., a number of voicemails, a number of unheard voicemails, voicemail identifiers, etc.) associated with VM server 120. Notification server 130 may provide the notification to user device 110 associated with the user.

In another example, notification server 130 may receive, from VM server 120, one or more messages associated with a voicemail user, and may store the message(s) in message store 150. Notification server 130 may generate one or more dynamic threads, based on an optimal number of threads received from management server 140, and may retrieve, from message store 150, a message when message store 150 is not empty and based on the dynamic thread(s). Notification server 130 may receive a binding from VM server 120, may generate a notification based on the retrieved message and/or the binding, and may provide the notification to user device 110 associated with the voicemail user. As used herein, the terms "thread" and "dynamic thread" are intended to be broadly interpreted to include one or more instructions that cause a processor to execute one or more processes (e.g., a process to retrieve messages from message store 150, a process to store messages in message store 150, etc.).

Management server 140 may include one or more server entities, or other types of computation or communication devices, that gather, process, search, and/or provide information in a manner described herein. Management server 140 may enable a load (e.g., a number of messages to be received and processed, a number of notifications to be processed and transmitted, etc.) on notification server 130 to be balanced via message store 150. In one exemplary implementation, management server 140 may obtain or receive a load associated with notification server 130, may obtain or receive a number of connections between notification server 130 and message store 150, and may obtain or receive a size of message store 150. Management server 140 may determine an optimal number of dynamic threads based on the load, the number of connections, and the size of message store 150, and may provide, to notification server 130, the optimal number of dynamic threads in order to load balance notification server 130.

Message store 150 may include one or more server entities, or other types of computation or communication devices, that gather, process, search, and/or provide information in a manner described herein. Message store 150 may include one or more storage devices that may store information received by and/or provided to notification server 130. In one implementation, message store 150 may store messages (e.g., that include a number of voicemails, a number of unheard voicemails, a list of voicemail identifiers (IDs), etc.) received from VM server 120 (e.g., by notification server 130), size information associated with available storage space provided by message store 150, etc. Although FIG. 1 shows message store 150 as separate from notification server 130, in other implementations, message store 150 may be incorporated in notification server 130.

Network 160 may include one or more networks of any type. For example, network 160 may include a local area network (LAN), a wide area network (WAN), a metropolitan area network (MAN), a telephone network, such as the Public Switched Telephone Network (PSTN) or Public Land Mobile Network (PLMN), an intranet, the Internet, an optical fiber (or fiber optic)-based network, or a combination of networks.

Although not shown in FIG. 1, network 100 may include a variety of other components, such as a device proxy server, a transcoding server, an authentication server, a gateway server, etc. The device proxy server may connect to user device 110, may route requests from user device 110 to VM server 120, the authentication server, the transcoding server, etc., and may convert content (e.g., voicemail lists, voicemail audio files, etc.) into a format that may be received by user device 110. The transcoding server may transcode an audio file into a format (e.g., MP3 format, QCP format, etc.) that may be played by user device 110. The authentication server may authenticate (e.g., via a login and/or password) a user associated with user device 110 if user device 110 attempts to access the device proxy server or VM server 120. The authentication server may store user credentials and/or may retrieve user credentials from VM server 120. If the user is authenticated, the authentication server may issue a temporary session data certificate (e.g., a cookie) to user device 110 that may be used for further data calls between user device 110 and VM server 120.

Figure 2:
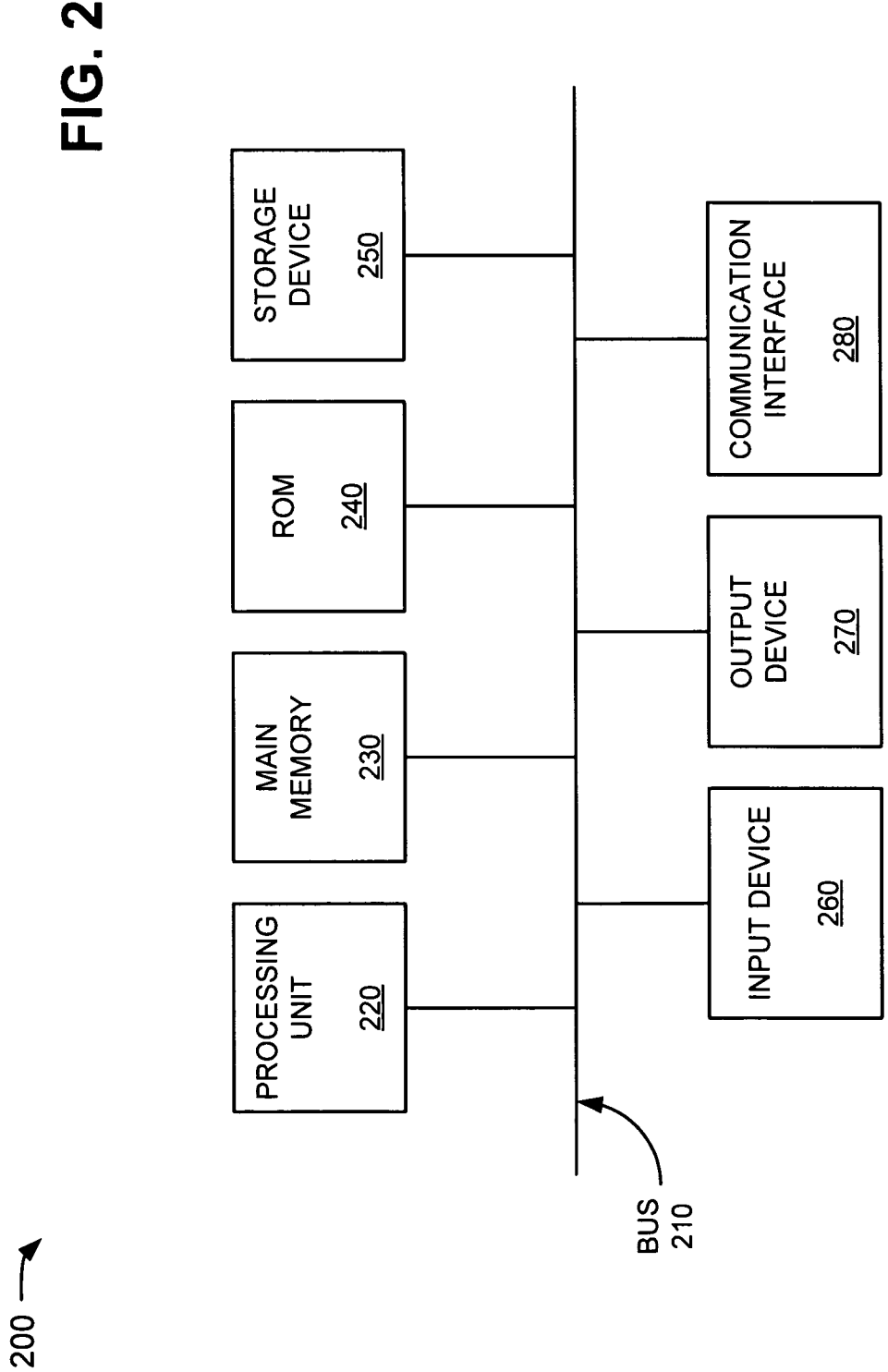
FIG. 2 illustrates a diagram of exemplary components of a user device, a voicemail (VM) server, a notification server, a management server, and/or a message store of the network depicted in FIG. 1.

FIG. 2 is an exemplary diagram of a device 200 that may correspond to user device 110, VM server 120, notification server 130, management server 140, and/or message store 150. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include one or more random access memories (RAMs) or other types of dynamic storage devices that may store information and instructions for execution by processing unit 220. ROM 240 may include one or more ROM devices or other types of static storage devices that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a remote control, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 160.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Figure 3:
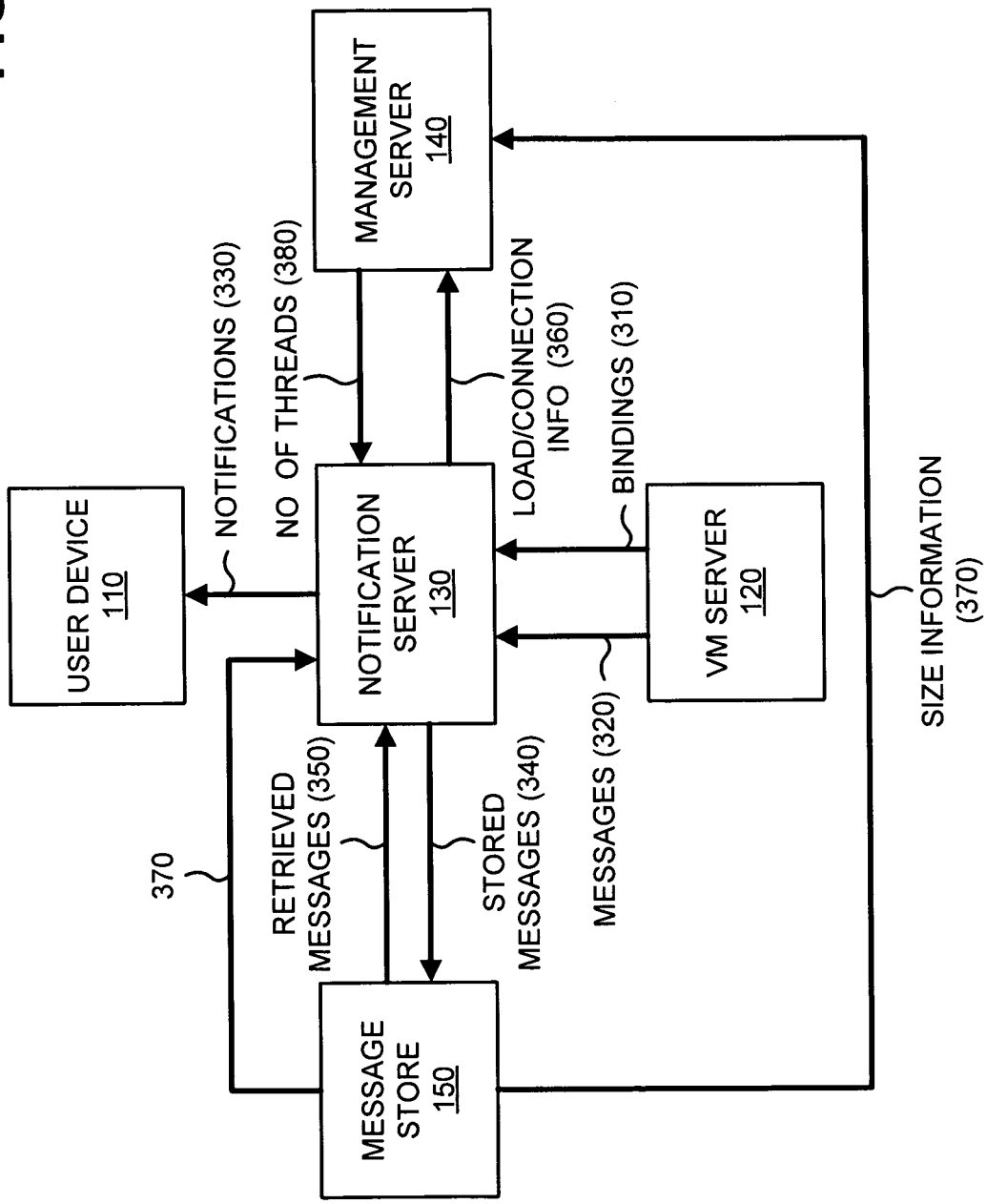
FIG. 3 depicts a diagram of exemplary interactions among components of an exemplary portion of the network illustrated in FIG. 1.

FIG. 3 depicts a diagram of exemplary interactions among components of an exemplary portion 300 of network 100. As illustrated, exemplary network portion 300 may include user device 110, VM server 120, notification server 130, management server 140, and message store 150. User device 110, VM server 120, notification server 130, management server 140, and message store 150 may include the features described above in connection with, for example, FIG. 1.

As further shown in FIG. 3, VM server 120 may provide bindings 310 and messages 320 to notification server 130. Messages 320 may be included in bindings 310 or may be separate from bindings 310. Bindings 310 may include references (e.g., identifiers) to values, machine addresses, etc. associated with notification server 130. Bindings 310 may also provide information that instructs notification server 130 to create notifications 330 (e.g., based on messages 320) and to send notifications 330 to particular user devices (e.g., user device 110) at particular times. Messages 320 may include a number of voicemails, a number of unheard voicemails, a list of voicemail identifiers (IDs), etc. Notifications 330 may include information associated with new voicemails, a number of voicemails, a number of unheard voicemails, a list of voicemail identifiers (IDs), etc. In one example, when new voicemails are received, VM server 120 may provide messages 320 to notification server 130. Notification server 130 may generate notifications 330 based on bindings 310 and messages 320, and may provide notifications 330 to user device 110.

In order to load balance notification server 130, in one implementation, notification server 130 may immediately store messages 320, as indicated by reference number 340, rather than process messages 320 (e.g., rather than creating notifications 330 based on messages 320). If message store 150 is not empty (e.g., contains stored messages 340), notification server 130 may retrieve messages, as indicated by reference number 350, from message store 150, and may process retrieved messages 350. For example, notification server 130 may create notifications 330 based on bindings 310 and/or retrieved messages 350, and may provide notifications 330 to user device 110.

Management server 140 may enable a load (e.g., a number of messages to be received and processed, a number of notifications to be processed and transmitted, etc.) on notification server 130 to be balanced via message store 150. For example, management server 140 may dynamically adjust (e.g., via a number threads) rates at which notification server 130 provides stored messages 340 to message store 150, receives retrieved messages 350 from message store 150, and/or processes retrieved messages 350. Management server 140 may receive, from notification server 130, load and/or connection information 360 associated with notification server 130. Load/connection information 360 may include a load associated with notification server 130, and a number of connections between notification server 130 and message store 150. Management server 140 may receive, from message store 150, size information 370 (e.g., amounts of used or unused storage space) associated with message store 150. Management server 140 may determine an optimal number 380 of dynamic threads based on load/connection information 360 and size information 370, and may provide, to notification server 130, optimal number 380 of dynamic threads in order to load balance notification server 130.

Notification server 130 may receive optimal number 380 of dynamic threads, and may create dynamic threads in accordance with optimal number 380. In one example, notification server 130 may create dynamic threads (e.g., optimal number 380 may be greater than zero) if the load on notification server 130 is small (e.g., below a threshold capacity, such as less than or equal to seventy percent capacity), the size storage space of message store 150 is large (e.g., above a particular size, such as greater than or equal to thirty percent capacity), and/or the number of connections between notification server 130 and message store 150 is small (e.g., below a particular number, such as fifty). In another example, notification server 130 may not create (or may terminate) dynamic threads (e.g., optimal number 380 may be zero) if the load on notification server 130 is large (e.g., above a threshold capacity, such as greater than or equal to ninety percent capacity), the size of storage space of message store 150 is small (e.g., below a particular size, such as less than or equal to ten percent capacity), and/or the number of connections between notification server 130 and message store 150 is large (e.g., above a particular number, such as one-hundred). Notification server 130 may utilize the dynamic threads to dynamically adjust rates at which stored messages 340 are provided to message store 150, retrieved messages 350 are received from message store 150, and retrieved messages 350 are processed.

Although FIG. 3 shows exemplary components of network portion 300, in other implementations, network portion 300 may contain fewer, different, differently arranged, or additional components than depicted in FIG. 3. In still other implementations, one or more components of network portion 300 may perform one or more other tasks described as being performed by one or more other components of network portion 300.

Figure 4:
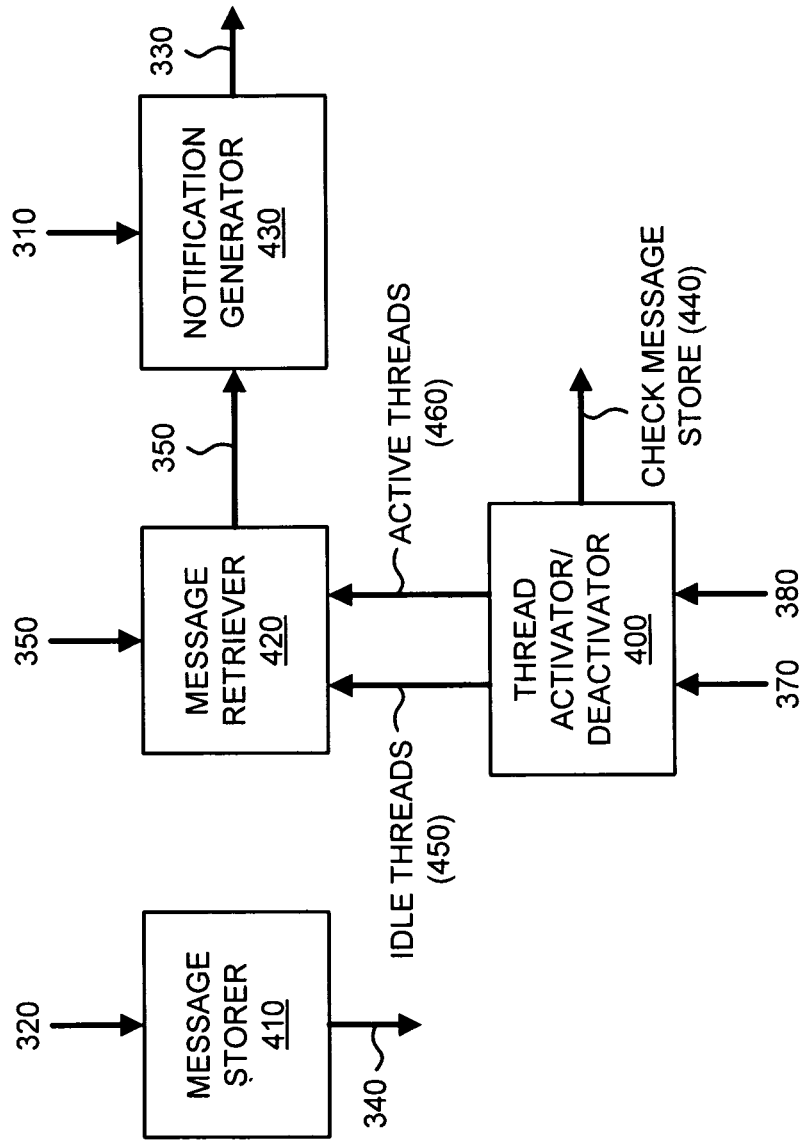
FIG. 4 illustrates a diagram of exemplary functional components of the notification server depicted in FIG. 1.

FIG. 4 illustrates a diagram of exemplary functional components of notification server 130. In one implementation, the functions described in connection with FIG. 4 may be performed by processing unit 220 (FIG. 2). As shown in FIG. 4, notification server 130 may include a thread activator/deactivator 400, a message storer 410, a message retriever 420, and a notification generator 430.

Thread activator/deactivator 400 may include hardware or a combination of hardware and software that may provide, to message store 150, a request 440 to check the size of message store 150, and may receive size information 370 from message store 150 based on request 440. Thread activator/deactivator 400 may also receive optimal number 380 of dynamic threads from management server 140. Thread activator/deactivator 400 may generate idle threads 450 and/or active threads 460 based on size information 370 and/or optimal number 380 of dynamic threads. If message store 150 is empty (e.g., at full capacity), thread activator/deactivator 400 may generate only idle threads 450 (or no threads). If message store 150 is not empty (e.g., at less than full capacity) or contains a number of messages 320 beyond a particular threshold, thread activator/deactivator 400 may generate only active threads 460 (or may convert idle threads 450 into active threads 460). Each of idle threads 450 may include information instructing notification server 130 (e.g., thread activator/deactivator 400) to reduce a frequency for checking message store 150 (e.g., via request 440) and to reduce a frequency for retrieving messages (e.g., via message retriever 420) from message store 150.

Each of active threads 460 may include information instructing notification server 130 (e.g., thread activator/deactivator 400) to increase a frequency for checking message store 150 (e.g., via request 440) and to increase a frequency for retrieving messages (e.g., via message retriever 420) from message store 150. Each of active threads 460 may include information instructing notification server 130 to wait a certain amount of time before checking message store 150 (e.g., via request 440) and before retrieving messages (e.g., via message retriever 420) from message store 150. This may prevent a "burst" scenario where all of the threads switch from idle threads 450 to active threads 460 at the same time and cause notification server 130 to simultaneously retrieve multiple messages 320 from message store 150. By waiting a certain amount of time, notification server 130 may prevent such a "burst" scenario, which may ease the load on message store 150 during active times.

Message storer 410 may include hardware or a combination of hardware and software that may receive messages 320 from VM server 120, and may immediately provide stored messages 340 (e.g., based on messages 320) to message store 150, rather than process messages 320 (e.g., rather than creating notifications 330 based on messages 320).

Message retriever 420 may include hardware or a combination of hardware and software that may receive idle threads 450 or active threads 460 from thread activator/deactivator 400. If message retriever 420 receives idle threads 450, message retriever 420 may reduce a frequency by which it receives retrieved messages 350 from message store 150. If message retriever 420 receives active threads 460, message retriever 420 may increase a frequency by which it receives retrieved messages 350 from message store 150. Active threads 460 may also instruct message retriever 420 to wait a certain amount of time before retrieving messages from message store 150. As further shown in FIG. 4, message retriever 420 may provide retrieved messages 350 to notification generator 430.

Notification generator 430 may include hardware or a combination of hardware and software that may receive bindings 310 from VM server 120, and may receive retrieved messages 350 from message retriever 420. Notification generator 430 may generate notifications 330 based on bindings 310 and/or retrieved messages 350, and may provide notifications 330 to one or more user devices (e.g., user device 110).

Although FIG. 4 shows exemplary functional components of notification server 130, in other implementations, notification server 130 may contain fewer, different, differently arranged, or additional functional components than depicted in FIG. 4. In still other implementations, one or more functional components of notification server 130 may perform one or more other tasks described as being performed by one or more other functional components of notification server 130.

Figure 5:
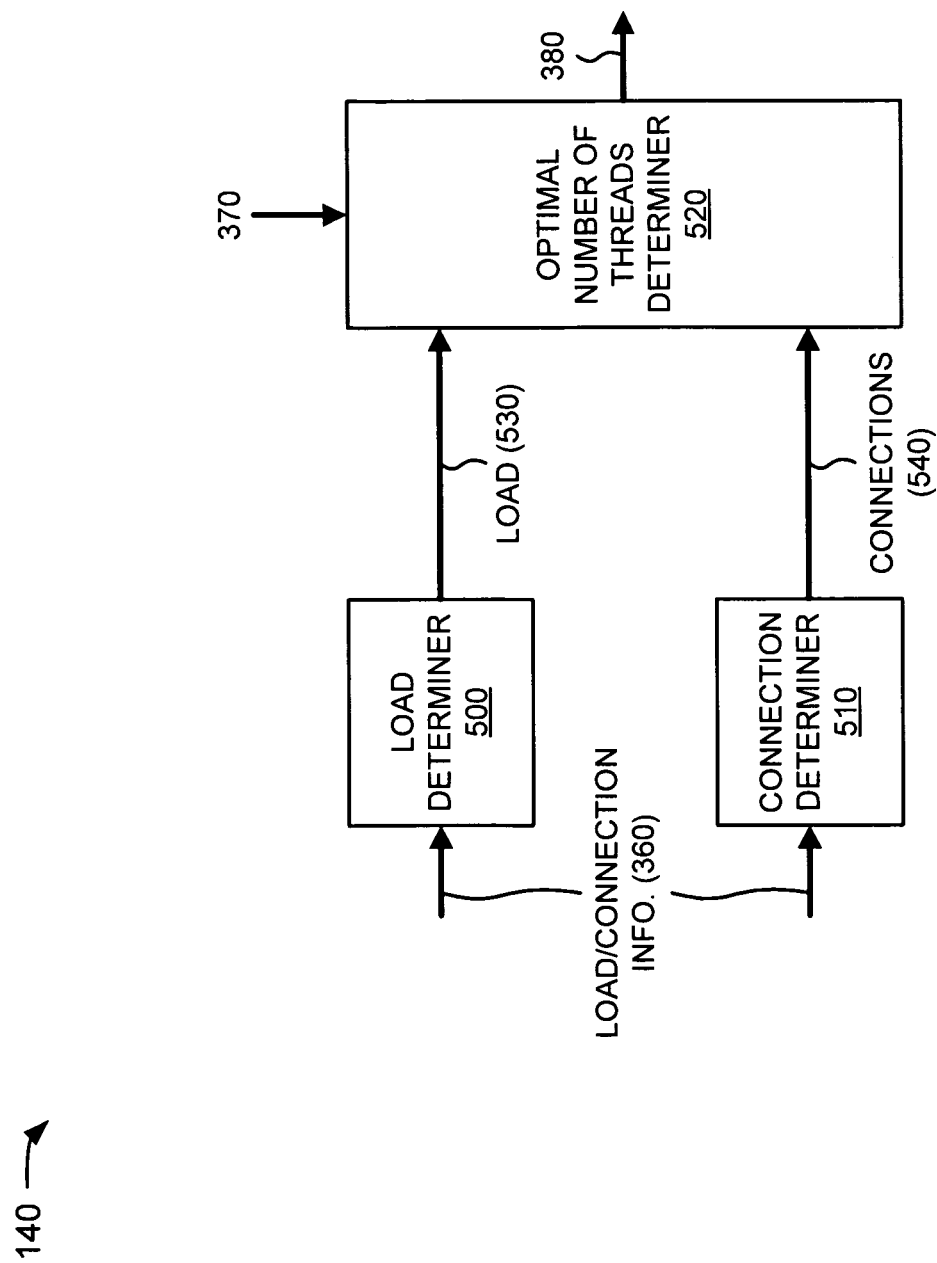
FIG. 5 depicts a diagram of exemplary functional components of the management server illustrated in FIG. 1.

FIG. 5 depicts a diagram of exemplary functional components of management server 140. In one implementation, the functions described in connection with FIG. 5 may be performed by processing unit 220 (FIG. 2). As shown in FIG. 5, management server 140 may include a load determiner 500, a connection determiner 510, and an optimal number of threads determiner 520.

Load determiner 500 may include hardware or a combination of hardware and software that may receive load/connection information 360 from notification server 130, and may generate a load 530 associated with notification server 130 based on load/connection information 360. Load 530 may include a number of messages 320 to be received and processed, a number of notifications 330 to be processed and transmitted, etc. by notification server 130. As further show in FIG. 5, load determiner 500 may provide load 530 to optimal number of threads determiner 520.

Connection determiner 510 may include hardware or a combination of hardware and software that may receive load/connection information 360 from notification server 130, and may generate connections 540 associated with notification server 130 based on load/connection information 360. Connections 540 may include a number of connections between notification server 130 and message store 150. As further shown in FIG. 5, connection determiner 510 may provide connections 540 to optimal number of threads determiner 520.

Optimal number of threads determiner 520 may include hardware or a combination of hardware and software that may receive load 530 from load determiner 500, may receive connections 540 from connection determiner 510, and may receive size information 370 from message store 150. Optimal number of threads determiner 520 may determine optimal number 380 of dynamic threads based on load 530, connections 540, and size information 370, and may provide, to notification server 130, optimal number 380 of dynamic threads in order to load balance notification server 130. In one example, optimal number 380 may be greater than zero if load 530 is small (e.g., below a threshold capacity, such as less than or equal to thirty percent capacity), the size (e.g., as determined from size information 370) of message store 150 is large (e.g., above a particular size, such as greater than or equal to thirty percent capacity), and/or connections 540 are small (e.g., below a particular number, such as fifty). In another example, optimal number 380 may be zero if load 530 is large (e.g., above a threshold capacity, such as greater than or equal to ninety percent capacity), the size of message store 150 is small (e.g., below a particular size, such as less than or equal to ten percent capacity), and/or connections 540 are large (e.g., above a particular number, such as one-hundred).

Although FIG. 5 shows exemplary functional components of management server 140, in other implementations, management server 140 may contain fewer, different, differently arranged, or additional functional components than depicted in FIG. 5. In still other implementations, one or more functional components of management server 140 may perform one or more other tasks described as being performed by one or more other functional components of management server 140.

Figure 6:
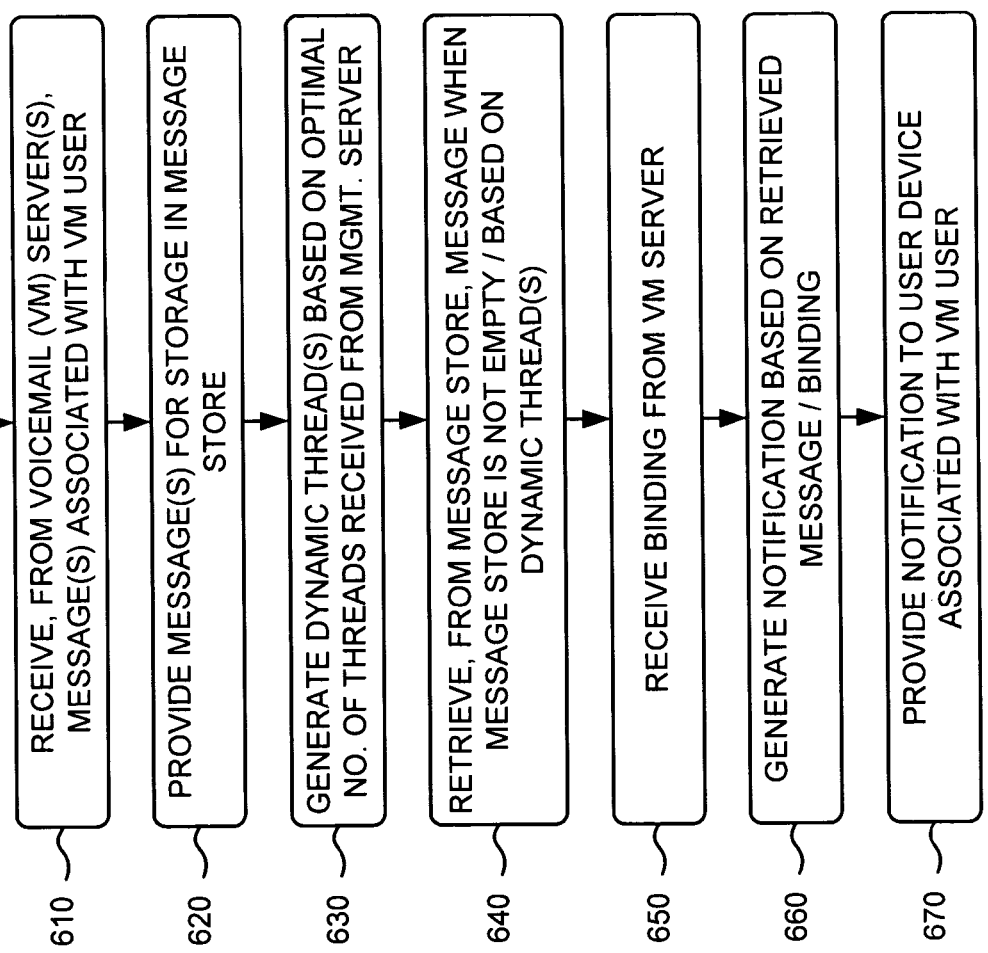
Figure 7:
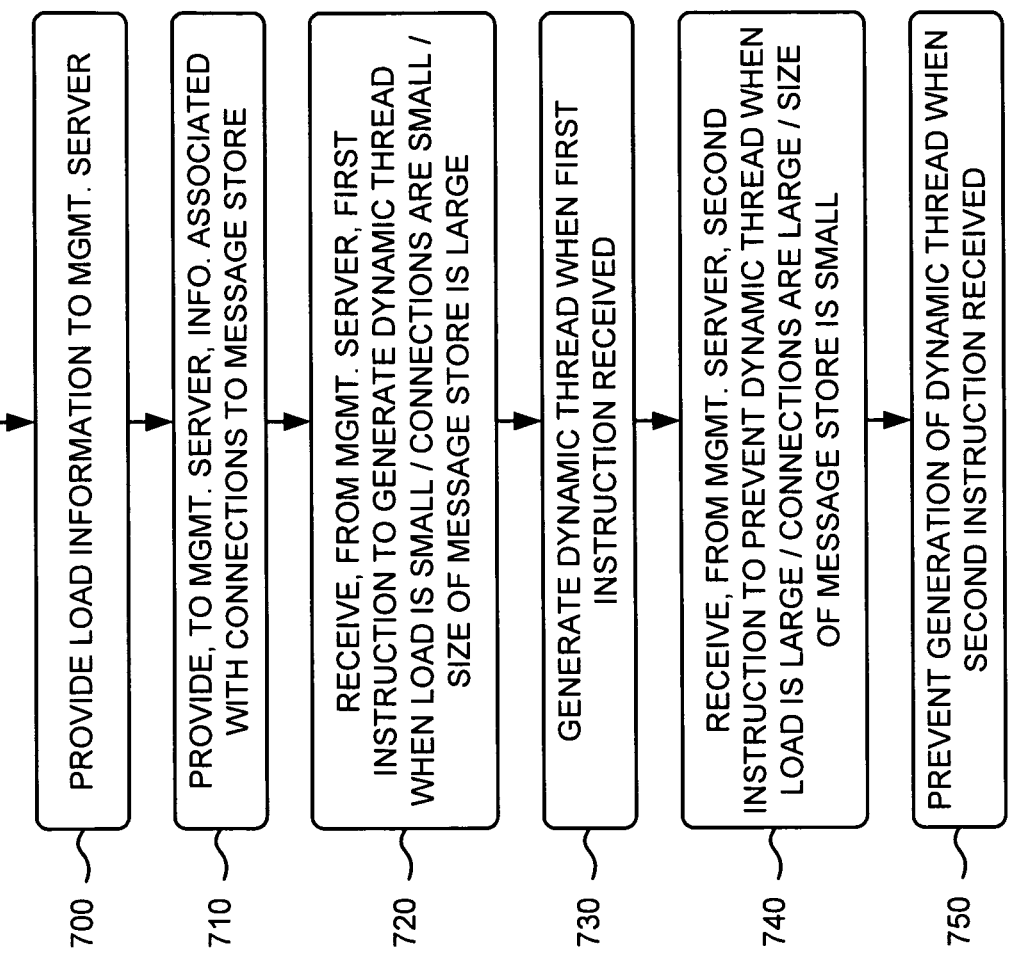

FIGS. 6-8 illustrate flow charts of an exemplary process 600 for load balancing a notification server with a message store according to implementations described herein. In one implementation, process 600 may be performed by notification server 130. In another implementation, some or all of process 600 may be performed by another device or group of devices, including or excluding notification server 130.

As illustrated in FIG. 6, process 600 may begin with receipt, from one or more voicemail (VM) servers, of one or more messages associated with a VM user (block 610), and providing the message(s) for storage in a message store (block 620). For example, in implementations described above in connection with FIG. 3, VM server 120 may provide bindings 310 and messages 320 to notification server 130. Messages 320 may be included in bindings 310 or may be separate from bindings 310. Messages 320 may include a number of voicemails, a number of unheard voicemails, a list of voicemail identifiers (IDs), etc. In one example, when new voicemails are received, VM server 120 may provide messages 320 to notification server 130. In order to load balance notification server 130, notification server 130 may immediately store messages 320, as indicated by reference number 340, rather than process messages 320 (e.g., rather than creating notifications 330 based on messages 320).

As further shown in FIG. 6, one or more dynamic threads may be generated based on an optimal number of threads received from a management server (block 630), and a message may be retrieved, based on the dynamic thread(s), from the message store when the message store is not empty (block 640). For example, in implementations described above in connection with FIG. 3, notification server 130 may receive optimal number 380 of dynamic threads, and may create dynamic threads in accordance with optimal number 380. In one example, notification server 130 may create dynamic threads (e.g., optimal number 380 may be greater than zero) if the load on notification server 130 is small, the size of message store 150 is large, and/or the number of connections between notification server 130 and message store 150 is small. If message store 150 is not empty (e.g., contains stored messages 340), notification server 130 may retrieve messages, as indicated by reference number 350, from message store 150, and may process retrieved messages 350. Notification server 130 may utilize the dynamic threads to dynamically adjust a rate at which retrieved messages 350 are received from message store 150.

Returning to FIG. 6, a binding may be received from the VM server (block 650), a notification may be generated based on the retrieved message and the binding (block 660), and the notification may be provided to a user device associated with the VM user (block 670). For example, in implementations described above in connection with FIG. 3, VM server 120 may provide bindings 310 to notification server 130. Notification server 130 may create notifications 330 based on bindings 310 and/or retrieved messages 350, and may provide notifications 330 to user device 110. Notifications 330 may include information associated with new voicemails, a number of voicemails, a number of unheard voicemails, a list of voicemail identifiers (IDs), etc.

Process block 630 may include the process blocks illustrated in FIG. 7. As shown in FIG. 7, process block 630 may include providing load information to the management server (block 700), and providing, to the management server, information associated with connections to the message store (block 710). For example, in implementations described above in connection with FIG. 3, management server 140 may receive, from notification server 130, load and/or connection information 360 associated with notification server 130. Load/connection information 360 may include a load associated with notification server 130, and a number of connections between notification server 130 and message store 150.

As further shown in FIG. 7, process block 630 may include receiving, from the management server, a first instruction to generate a dynamic thread when the load is small, when the connections are small, and/or when the size of the message store is large (block 720), and generating a dynamic thread when the first instruction is received (block 730). For example, in implementations described above in connection with FIG. 3, notification server 130 may create dynamic threads (e.g., optimal number 380 may be greater than zero) if the load on notification server 130 is small (e.g., below a threshold capacity, such as less than or equal to seventy percent capacity), the size of message store 150 is large (e.g., above a particular size, such as greater than or equal to thirty percent capacity), and/or the number of connections between notification server 130 and message store 150 is small (e.g., below a particular number, such as fifty).

Returning to FIG. 7, process block 630 may include receiving, from the management server, a second instruction to prevent a dynamic thread when the load is large, when the connections are large, and/or when the size of the message store is small (block 740), and preventing generation of a dynamic thread when the second instruction is received (block 750). For example, in implementations described above in connection with FIG. 3, notification server 130 may not create (or may terminate) dynamic threads (e.g., optimal number 380 may be zero) if the load on notification server 130 is large (e.g., above a threshold capacity, such as greater than or equal to ninety percent capacity), the size of message store 150 is small (e.g., below a particular size, such as less than or equal to ten percent capacity), and/or the number of connections between notification server 130 and message store 150 is large (e.g., above a particular number, such as one-hundred).

Process block 640 may include the process blocks illustrated in FIG. 8. As shown in FIG. 8, process block 640 may include checking a size of the message store with a particular frequency (block 800), and receiving information associated with the size of the message store based on the check (block 810). For example, in implementations described above in connection with FIG. 4, thread activator/deactivator 400 of notification server 130 may provide, to message store 150, request 440 to check the size of message store 150, and may receive size information 370 from message store 150 based on request 440.

As further shown in FIG. 8, process block 640 may include placing the dynamic threads in an idle mode when the size information indicates that the message store is empty (block 820), and reducing the particular frequency for checking the message store when the dynamic threads are in the idle mode (block 830). For example, in implementations described above in connection with FIG. 4, if message store 150 is empty (e.g., at full capacity), thread activator/deactivator 400 may generate only idle threads 450. Each of idle threads 450 may include information instructing notification server 130 (e.g., thread activator/deactivator 400) to reduce a frequency for checking message store 150 (e.g., via request 440) and to reduce a frequency for retrieving messages (e.g., via message retriever 420) from message store 150.

Returning to FIG. 8, process block 640 may include placing the dynamic threads in an active mode when the size information indicates that the message store is not empty (block 840), and waiting a particular amount of time before retrieving the message from the message store when the dynamic threads are in the active mode (block 850). For example, in implementations described above in connection with FIG. 4, if message store 150 is not empty (e.g., at less than full capacity) or contains a number of messages 320 beyond a particular threshold, thread activator/deactivator 400 may generate only active threads 460 (or may convert idle threads 450 into active threads 460). Each of active threads 460 may include information instructing notification server 130 to wait a certain amount of time before checking message store 150 (e.g., via request 440) and before retrieving messages (e.g., via message retriever 420) from message store 150. This may prevent a "burst" scenario where all of the threads switch from idle threads 450 to active threads 460 at the same time and cause notification server 130 to simultaneously retrieve multiple messages 320 from message store 150. By waiting a certain amount of time, notification server 130 may prevent such a "burst" scenario, which may ease the load on message store 150 during active times.

FIG. 9 depicts a flow chart of an exemplary process 900 for load balancing a notification server with dynamically adjusted threads according to implementations described herein. In one implementation, process 900 may be performed by management server 140. In another implementation, some or all of process 900 may be performed by another device or group of devices, including or excluding management server 140.

As illustrated in FIG. 9, process 900 may begin with receipt of a load associated with a notification server (block 910), receipt of a number of connections between the notification server and a message store (block 920), and receipt of a size of the message store (block 930). For example, in implementations described above in connection with FIG. 3, management server 140 may receive, from notification server 130, load and/or connection information 360 associated with notification server 130. Load/connection information 360 may include a load associated with notification server 130, and a number of connections between notification server 130 and message store 150. Management server 140 may receive, from message store 150, size information 370 (e.g., amounts of used or unused storage space) associated with message store 150.

As further shown in FIG. 9, an optimal number of dynamic threads may be determined based on the load, the number of connections, and/or the size of the message store (block 940), and the optimal number of dynamic threads may be provided to the notification server in order to load balance the notification server (block 950). For example, in implementations described above in connection with FIG. 3, management server 140 may determine optimal number 380 of dynamic threads based on load/connection information 360 and size information 370, and may provide, to notification server 130, optimal number 380 of dynamic threads in order to load balance notification server 130. Optimal number 380 of dynamic threads may enable a load (e.g., a number of messages to be received and processed, a number of notifications to be processed and transmitted, etc.) on notification server 130 to be balanced via message store 150. In one example, management server 140 may dynamically adjust (e.g., via optimal number 380 of dynamic threads) rates at which notification server 130 provides stored messages 340 to message store 150, receives retrieved messages 350 from message store 150, and/or processes retrieved messages 350.

Implementations described herein may provide systems and/or methods that load balance one or more notification servers associated with a voicemail system and/or a VVM system. In one implementation, for example, the systems and/or methods may receive, from one or more voicemail servers, one or more messages associated with a voicemail user, and may store the one or more message in a message store. The systems and/or methods may generate one or more dynamic threads, based on an optimal number of threads received from a management server, and may retrieve, from the message store, a message when the message store is not empty and based on the one or more dynamic threads. The systems and/or methods may receive a binding from the one or more voicemail servers, may generate a notification based on the retrieved message and the binding, and may provide the notification to a user device associated with the voicemail user.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6-9, the order of the blocks may be modified in other implementations. Further, non-dependent blocks may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method comprising:
 receiving, from a server and by the computing device, a particular number of threads;
 generating, by the computing device, a dynamic thread based on the particular number of threads, the generating the dynamic thread including:
  providing, to the server, information associated with a load of the computing device;
  providing, to the server, information associated with connections between the computing device and a message store;

receiving, from the server, an instruction to generate the dynamic thread when one or more of the load is less than or equal to a particular load, a number of the connections is less than or equal to a particular number, or size information associated with the message store is greater than or equal to a particular size; and generating, based on receiving the instruction, the dynamic thread;

retrieving, from the message store and by the computing device, a message based on the dynamic thread and when the message store is not empty;

receiving, by the computing device, a binding from another server associated with a user;

generating, by the computing device, a notification based on the retrieved message and based on the binding; and providing, by the computing device, the notification to a user device associated with the user.

2. The computing device-implemented method of claim 1, further comprising:

receiving, from the other server, a plurality of messages associated with the user; and providing, to the message store, the plurality of messages for storage in the message store.

3. The computing device-implemented method of claim 1, where retrieving the message comprises:

checking a size of the message store with a particular frequency;

receiving, based on the checking, information associated with the size of the message store; and retrieving, from the message store, the message when the information associated with the size of the message store indicates that the message store is not empty.

4. The computing device-implemented method of claim 3, further comprising:

placing the dynamic thread in an idle mode when the information associated with the size of the message store indicates that the message store is empty; and reducing the particular frequency for checking the size of the message store when the dynamic thread is in the idle mode.

5. The computing device-implemented method of claim 3, further comprising:

placing the dynamic thread in an active mode when the information associated with the size of the message store indicates that the message store is not empty; and waiting a particular amount of time before retrieving the message, from the message store, when the dynamic thread is in the active mode.

6. The computing device-implemented method of claim 1, where the computing device comprises a notification server.

7. The computing device-implemented method of claim 1, where the retrieved message comprises one or more of:
a new voicemail,
an unheard voicemail, or
a voicemail identifier.

8. The computing device-implemented method of claim 1, further comprising:

adjusting a rate associated with retrieving the message based on the dynamic thread.

9. A device comprising:
a memory to store a plurality of instructions; and
a processor to execute the plurality of instructions in the memory to:
receive, from a first server, a plurality of messages associated with a user,
provide, to a message store, the plurality of messages for storage in the message store,
receive, from a second server, an particular number of threads,
generate a dynamic thread based on the particular number of threads,
when generating the dynamic thread, the processor being further to:
provide, to the second server, information associated with a load of the device;
provide, to the second server, information associated with connections between the device and the message store;
receive, from the second server, an instruction to generate the dynamic thread when one or more of the load is less than or equal to a particular load, a number of the connections is less than or equal to a particular number, or or size information associated with the message store is greater than or equal to a particular size; and
generate, based on receiving the instruction, the dynamic thread;
retrieve, from the message store, one of the plurality of messages based on the dynamic thread and when the message store is not empty,
receive a binding from the first server,
generate a notification based on the retrieved message and based on the binding, and
provide the notification to a user device associated with the user.

10. The device of claim 9, where the processor is further to execute instructions in the memory to:
check a size of the message store with a particular frequency,
receive, based on the checking, information associated with the size of the message store, and
retrieve, from the message store, the one of the plurality of messages when the siz information associated with the size of the message store indicates that the message store is not empty.

11. The device of claim 10, where the processor is further to execute instructions in the memory to:
place the dynamic thread in an idle mode when the information associated with the size of the message store indicates that the message store is empty, and
reduce the particular frequency for checking the size of the message store when the dynamic thread is in the idle mode.

12. The device of claim 10, where the processor is further to execute instructions in the memory to:
place the dynamic thread in an active mode when the information associated with the size of the message store indicates that the message store is not empty, and
wait a particular amount of time before retrieving the one of the plurality of messages, from the message store, when the dynamic thread is in the active mode.

13. The device of claim 9, where the retrieved message comprises one or more of:
a new voicemail,
an unheard voicemail, or
a voicemail identifier.

14. The device of claim 9, where the processor is further to execute instructions in the memory to:
adjust a rate associated with retrieving the one of the plurality of messages based on the dynamic thread.

15. A system comprising:
a first server to:
receive, from a second server, a particular number of threads, generate a dynamic thread based on the particular number of threads,
  when generating the dynamic thread, the first server being further to:
    provide, to the second server, information associated with a load of the first server,
    provide, to the second server, information associated with connections between the first server and a message store,
    receive, from the second server, an instruction to generate the dynamic thread when one or more of the load is less than or equal to a particular load, a number of the connections is less than or equal to a particular number, or size information associated with the message store is greater than or equal to a particular size, and
    generate, based on receiving the instruction, the dynamic thread,
  retrieve, from the message store, one of a plurality of messages based on the dynamic thread and when the message store is not empty,
  receive a binding from a third server associated with the user,
  generate a notification based on the retrieved message and based on the binding, and
  provide the notification to a user device associated with the user.

16. The system of claim 15, where the first server is further to:
  receive, from the third server, the plurality of messages, and
  provide, to the message store, the plurality of messages for storage.

17. The system of claim 15, where the first server is further to:
  check the size associated with the message store with a particular frequency,
  receive, based on the checking, information associated with the size of the message store, and
  retrieve, from the message store, the one of the plurality of messages when the information associated with the size of the message store indicates that the message store is not empty.

18. The system of claim 17, where the first server is further to:
  place the dynamic thread in an idle mode when the information associated with the size of the message store indicates that the message store is empty, and
  reduce the particular frequency for checking the size of the message store when the dynamic thread is in the idle mode.

19. The system of claim 17, where the first server is further to:
  place the dynamic thread in an active mode when the information associated with the size of the message store indicates that the message store is not empty, and
  wait a particular amount of time before retrieving the one of the plurality of messages, from the message store, when the dynamic thread is in the active mode.

20. The system of claim 15, where the first server is further to:
  adjust a rate associated with retrieving the one of the plurality of messages based on the dynamic thread.

21. A non-transitory computer-readable medium storing instructions, the instructions comprising:
  one or more instructions which, when executed by at least one processor of a device, cause the at least one processor to:
    receive, from a first server, a plurality of messages associated with a user,
    provide, to a message store, the plurality of messages for storage in the message store,
    receive, from a second server, an particular number of threads,
    generate a dynamic thread based on the particular number of threads, the one or more instructions to generate the dynamic thread including one or more instructions to:
      provide, to the second server, information associated with a load of the device;
      provide, to the second server, information associated with connections between the device and the message store;
      receive, from the second server, an instruction to generate the dynamic thread when one or more of the load is less than or equal to a particular load, a number of the connections is less than or equal to a particular number, or size information associated with the message store is greater than or equal to a particular size; and
      generate, based on receiving the instruction, the dynamic thread;
    retrieve, from the message store, one of the plurality of messages based on the dynamic thread and when the message store is not empty,
    receive a binding from the first server,
    generate a notification based on the retrieved message and based on the binding, and
    provide the notification to a user device associated with the user.

22. The medium of claim 21, the instructions further comprising:
  one or more instructions to check a size of the message store with a particular frequency,
  one or more instructions to receive, based on the checking, information associated with the size of the message store, and
  one or more instructions to retrieve, from the message store, the one of the plurality of messages when the information associated with the size of the message store indicates that the message store is not empty.

23. The medium of claim 22, the instructions further comprising:
  one or more instructions to place the dynamic thread in an idle mode when the information associated with the size of the message store indicates that the message store is empty, and
  one or more instructions to reduce the particular frequency for checking the size of the message store when the dynamic thread is in the idle mode.

24. The medium of claim 22, the instructions further comprising:
  one or more instructions to place the dynamic thread in an active mode when the information associated with the size of the message store indicates that the message store is not empty, and
  one or more instructions to wait a particular amount of time before retrieving the one of the plurality of messages, from the message store, when the dynamic thread is in the active mode.

25. The medium of claim 21, the instructions further comprising:

one or more instructions to adjust a rate associated with retrieving the one of the plurality of messages based on the dynamic thread.

* * * * *